(12) United States Patent
Kleber et al.

(10) Patent No.: US 9,316,276 B2
(45) Date of Patent: Apr. 19, 2016

(54) THERMALLY COMPENSATING CAST-IN-PLACE TORSION JOINT WITH IMPROVED AXIAL STIFFNESS

(71) Applicant: GM Global Technology Operations LLC, Detroit, MI (US)

(72) Inventors: Richard M. Kleber, Clarkston, MI (US); Tomasz Warzecha, Sterling Heights, MI (US); Silviu A. Pepescu, Ajax (CA); Mark T. Riefe, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 17 days.

(21) Appl. No.: 14/107,432

(22) Filed: Dec. 16, 2013

(65) Prior Publication Data
US 2015/0167763 A1    Jun. 18, 2015

(51) Int. Cl.
*F16D 65/12* (2006.01)
*B22D 19/00* (2006.01)
*F16D 65/02* (2006.01)

(52) U.S. Cl.
CPC ............. *F16D 65/123* (2013.01); *B22D 19/00* (2013.01); *F16D 65/128* (2013.01); *B22D 19/0081* (2013.01); *F16D 2065/1316* (2013.01); *F16D 2065/1328* (2013.01); *F16D 2065/1356* (2013.01); *F16D 2065/1376* (2013.01); *F16D 2065/1388* (2013.01)

(58) Field of Classification Search
USPC ..... 188/18 A, 218 A, 218 R, 218 XL, 264 A, 188/264 AA
See application file for complete search history.

(56) References Cited

U.S. PATENT DOCUMENTS

| | | | | | |
|---|---|---|---|---|---|
| 3,680,675 | A | * | 8/1972 | Livezey | 192/107 R |
| 5,005,676 | A | * | 4/1991 | Gassiat | 188/218 XL |
| 5,568,846 | A | * | 10/1996 | Dagh et al. | 188/218 XL |
| 6,135,247 | A | * | 10/2000 | Bodin et al. | 188/218 XL |
| 7,861,832 | B2 | * | 1/2011 | Kleber | 188/218 XL |

* cited by examiner

*Primary Examiner* — Christopher Schwartz
(74) *Attorney, Agent, or Firm* — BrooksGroup

(57) ABSTRACT

A number of variations may include a brake disc may include a hub portion and a cheek portion. The hub portion may include a receiving flange for mechanically engaging the cheek portion. The cheek portion may include an upper cheek and a lower cheek connected and separated by a web, and an inner flange extending radially inward from the upper cheek to mechanically engage and communicate with the receiving flange of the hub portion such that the hub portion and the cheek portion form a single brake disc. The inner flange may include a at least one spline tooth circumferentially arranged around the inner flange and constructed and arranged to facilitate the mechanical engagement of the receiving flange and the inner flange.

15 Claims, 4 Drawing Sheets

View A

View B

THERMALLY COMPENSATING CAST-IN-PLACE TORSION JOINT WITH IMPROVED AXIAL STIFFNESS

TECHNICAL FIELD

The field to which the disclosure generally relates includes disc brakes.

BACKGROUND

Some disc brakes have separate portions of different materials that are joined together. The separate portions may be joined by a cast-in-place process in that one portion is cast over the other portion to form a joint thereat. But during use, thermal expansion and contraction could adversely affect the joint such as by permanently deforming the joint or causing a loose fit at the joint.

SUMMARY OF ILLUSTRATIVE VARIATIONS OF THE INVENTION

A number of variations may include a product that may include a first portion and a second portion. The first portion may include a first material and may have a flange protruding from the first portion. The flange may terminate at a free end and may taper in height toward the free end. The flange may have at least one spline tooth that may be located on a surface of the flange. Each of the spline teeth may be spaced apart from one another on the surface of the flange. The second portion may include a second material that is different than the first material. The second portion may have a portion that is cast-in-place over a part of or the entire flange and over the at least one spline tooth. The cast-in-place process may form an interconnection between the first and second portions so that relative movement between the first and second portions is substantially prevented. Thermal expansion and contraction that may occur during use of the first and second portions is accommodated for at the interconnection.

A number of variations may include a product that may include a brake rotor that itself may include a cheek portion and a hub portion. The cheek portion may include a first material and the hub portion may include a second material that is different than the first material or is the same as the first material. The cheek portion may have a at least one spline tooth extending toward an axis of rotation of the brake rotor that is defined during use. The at least one spline tooth may taper in axial height toward the axis of rotation. Each spline tooth may be circumferentially spaced apart from a neighboring spline tooth such that all of the spline teeth are spaced apart from one another. The hub portion may have a receiving flange that is cast-in-place over a part of, or substantially all of the at least one spline tooth located on the cheek portion. An interconnection may be formed between the cheek and hub portions at the at least one spline tooth and receiving flange so that relative movement, such as rotational movement, between the portions is substantially prevented during use. Any thermal expansion and contraction that may occur during use of the brake rotor is accommodated for at the interconnection.

A number of variations may include a method of making a product. The method may include providing a cheek portion of a brake rotor. The cheek portion may include a first material and may have a at least one spline tooth that extend toward an axis of rotation of the cheek portion that is defined during use of the brake rotor. Each individual spline tooth may be circumferentially spaced from a neighboring flange such that the spline teeth are circumferentially spaced apart from one another. Each of the spline teeth may taper in axial height toward the axis of rotation and may taper in circumferential thickness toward the axis of rotation. The method may also include placing the cheek portion in a first cavity of a first molding machine half, and may include bringing the first molding machine half and a second molding machine half together to form a cavity. The method may further include coating the at least one spline tooth with a ceramic or non-wetting coating or similar material to prevent intermetallic bonding between the cheek portion and a second molten material subsequently added to the cavity. The method may further include filling the cavity with a molten second material that is different than the first material. When solidified, the second material may form a hub portion of the brake rotor. The hub portion may have a receiving flange that is formed around a part of, or substantially all of the at least one spline tooth on the cheek portion. The second material may be allowed to cool and solidify wherein during cooling; the second material may contract and define a gap between the surface of the at least one spline tooth of the cheek portion and the receiving flange of the hub portion. An interconnection may be created between the cheek and hub portions at the first and receiving flanges so that relative movement, such as rotational movement, between the portions is substantially prevented.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the scope of the invention, its application, or uses. The following description of variants is only illustrative of elements, acts, products, and methods considered to be within the scope of the invention and are not in any way intended to limit such scope by what is specifically disclosed or not expressly set forth. The elements, acts, products, and methods as described herein may be combined and rearranged other than as expressly described herein and still are considered to be within the scope of the invention.

Furthermore, as used herein, the terms axially, radially, and circumferentially refer to directions relative to the generally circular shape of a brake rotor, so that the radial direction extends generally along any one of the radii of the circular shape, the axial direction is generally parallel to a center axis of the circular shape, and the circumferential direction extends generally along any one of the circumferences of the circular shape.

Figure 1:
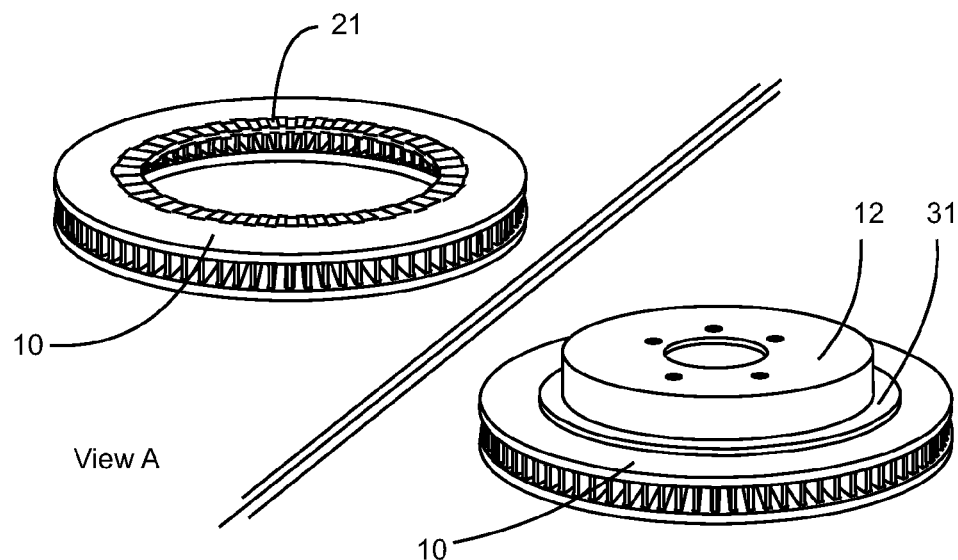
FIG. 1 shows one illustrative variation of the invention.

Referring to FIG. 1, View A and View B, a product may include a cheek portion 10 that may include a first flange 21. The product may also include a hub portion 12 that may include a receiving flange 31. The receiving flange 31 and the first flange 21 may be constructed and arranged to mechanically interlock such that the cheek portion 10 and the hub portion 12 form the product.

Figure 2:
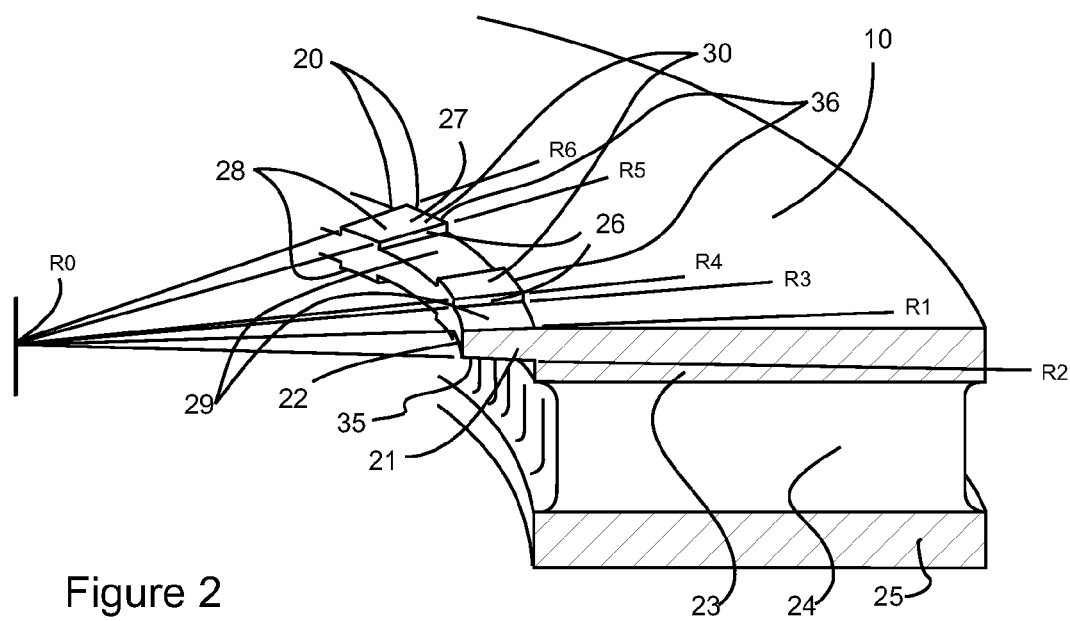
FIG. 2 shows a sectional view of one illustrative variation of the invention.

Referring to FIG. 2, a product may include a cheek portion 10 that may include a first flange 21, an upper cheek 23, a lower cheek 25, and webbing 24 that may be disposed between the upper cheek 23 and the lower cheek 25. The first flange 21 may include at least one of repeating faceted surfaces 26, 27, 28, and 29 that define a at least one spline tooth 30. The at least one spline tooth 30, and the at least one of repeating faceted surfaces 26, 27, 28, and 29 may be defined by radial lines extending from an emanation point R0 that may be located at the axial center of the cheek portion 10. For example, an imaginary line R0-R1 may extend from the point R0 to a point R1 and may define an upper flange face 29 of the first flange 21. In a similar way, line R0-R2 may define a lower flange face 35 of the first flange 21. As the imaginary lines R0-R1 and R0-R2 are rotated about the axial center of the cheek portion 10 located at R0, a shallow conical shape defines the first flange 21 as the upper flange face 29 and the lower flange face 35 gradually converge towards point R0. The inner flange 21 may be truncated at an inner circumferential face 22 such that the converging upper flange face 29 and lower flange face 35 do not meet at the point of convergence R0.

Lines R0-R3, R0-R4, R0-R5, and R0-R6 may define the edges of the at least one of repeating faceted surfaces 26, 27, 28, and 29 such that the at least one of repeating faceted surfaces 26, 27, 28, and 29 may define at least one spline tooth 30 wherein an upper surface of an individual spline tooth may be one faceted surface 27 and a lower surface of an individual spline tooth may be one faceted surface 28 where the faceted surfaces 27 and 28 may protrude from upper flange face 29 and lower flange face 35, respectively. The at least one spline tooth 30 may also include a rear faceted face 36 opposite the inner circumferential face 22.

Figure 3:
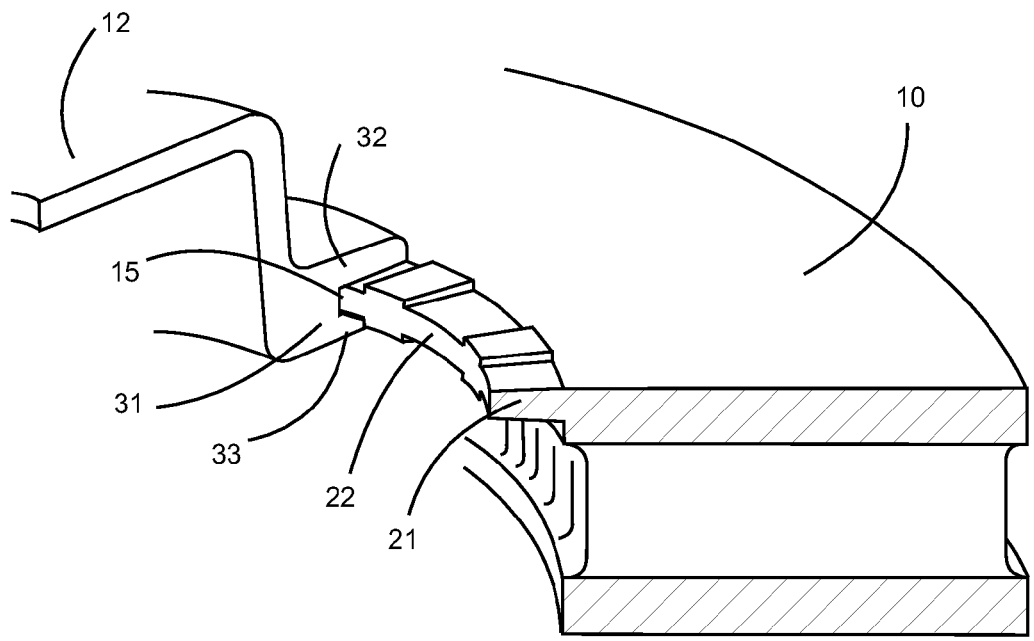
FIG. 3 shows a sectional view of one illustrative variation of the invention.

Referring to FIG. 3, the cheek portion 10 may be fixed to a hub portion 12. The hub portion 12 may include a receiving flange 31 that may include an upper flange 32 and a lower flange 33. The receiving flange 31 may be constructed and arranged to receive the first flange 21 such that the hub portion 12 is fixed to the cheek portion 10. The hub portion 12 and the cheek portion 10 may define a gap 15 lying between the receiving flange 31 and the inner circumferential face 22.

Figure 4:
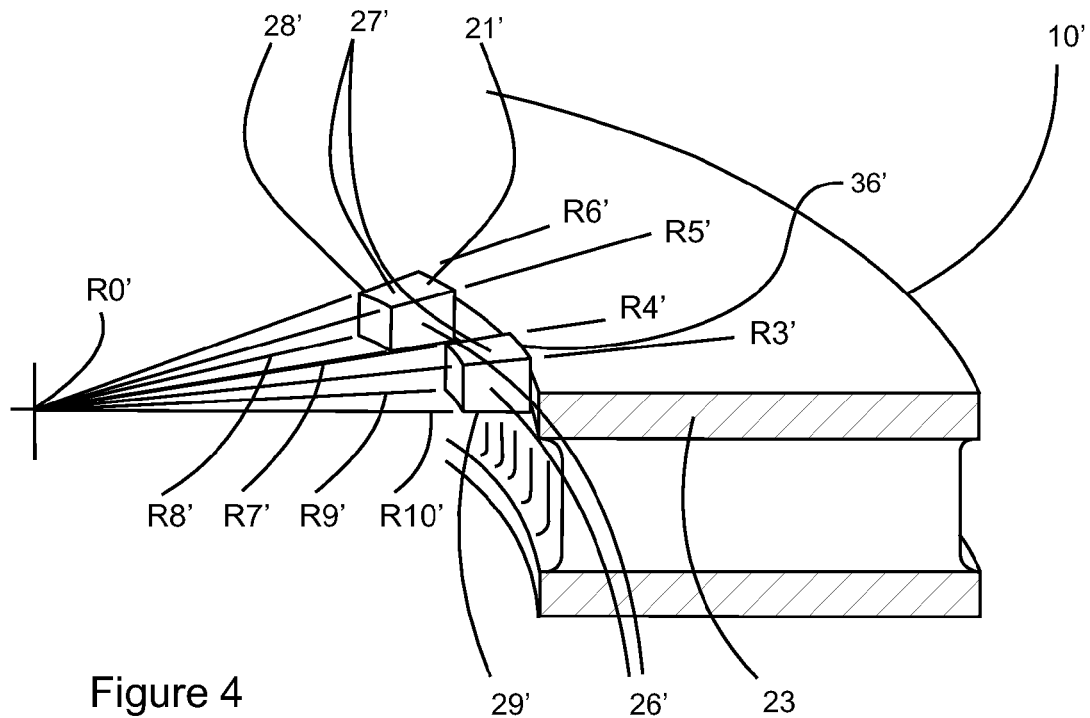
FIG. 4 shows a sectional view of one illustrative variation of the invention.

Referring to FIG. 4, the cheek portion 10' may include at least one spline tooth 21'. Lines R0'-R3', R0'-R4', R0'-R5', and R0'-R6' may define the edges of the at least one of repeating faceted surfaces 26', 27', 28', and 29' such that the at least one of repeating faceted surfaces 26', 27', 28', and 29' may define a at least one spline tooth 21' wherein an upper surface of an individual spline tooth may be one faceted surface 27' and a lower surface of an individual spline tooth may be one faceted surface 29' and where the faceted surfaces 26' and 28' may be the sides of an individual spline tooth 21'. The at least one spline tooth 21' may also include a rear faceted face 36' opposite an inner circumferential face 22'.

Figure 5:
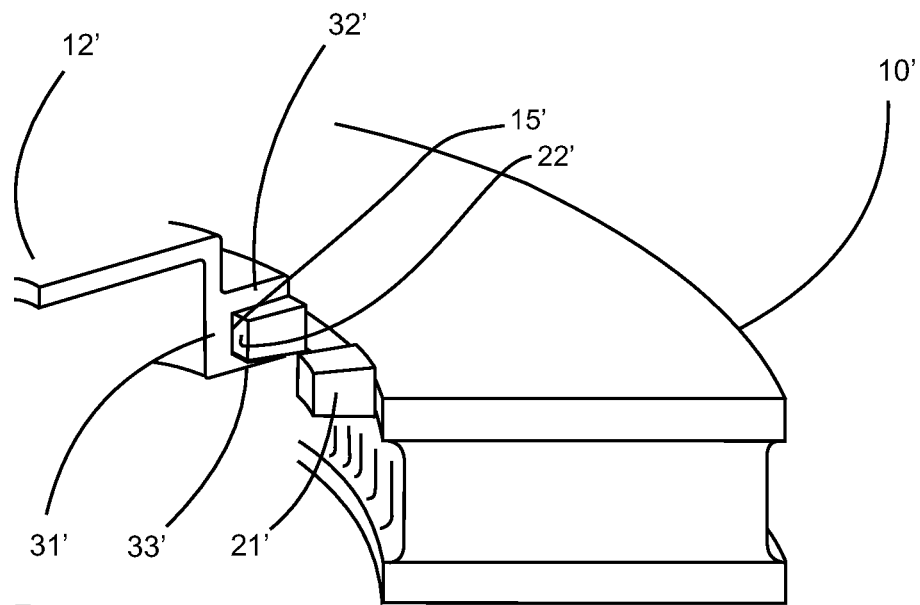
FIG. 5 shows a sectional view of one illustrative variation of the invention.

Referring to FIG. 5, the cheek portion 10' may be fixed to a hub portion 12'. The hub portion 12' may include a receiving flange 31' that may include an upper flange 32' and a lower flange 33'. The receiving flange 31' may be constructed and arranged to receive the first flange 21' such that the hub portion 12' is fixed to the cheek portion 10'. The hub portion 12' and the cheek portion 10' may define a gap 15' lying between the receiving flange 31' and an inner circumferential face 22'.

Figure 6:
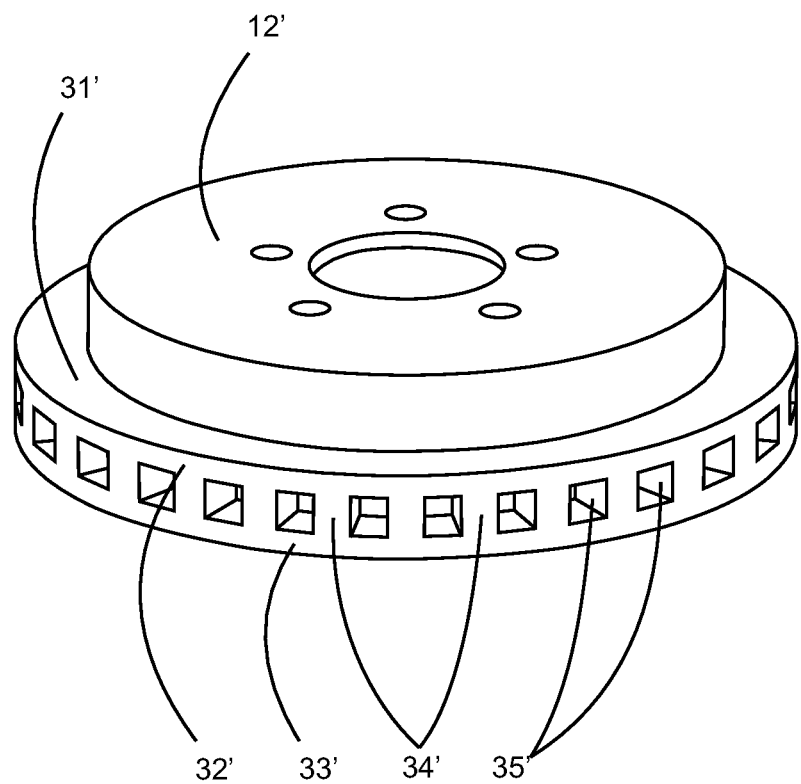
FIG. 6 shows one illustrative variation of the invention.

Referring to FIG. 6, the hub portion 12' may include a receiving flange 31' that may include an upper flange 32' and a lower flange 33'. The hub portion 12' may also include integral columns 34', which, in combination with the upper flange 32' and the lower flange 33' may define voids 35'.

Figure 7:
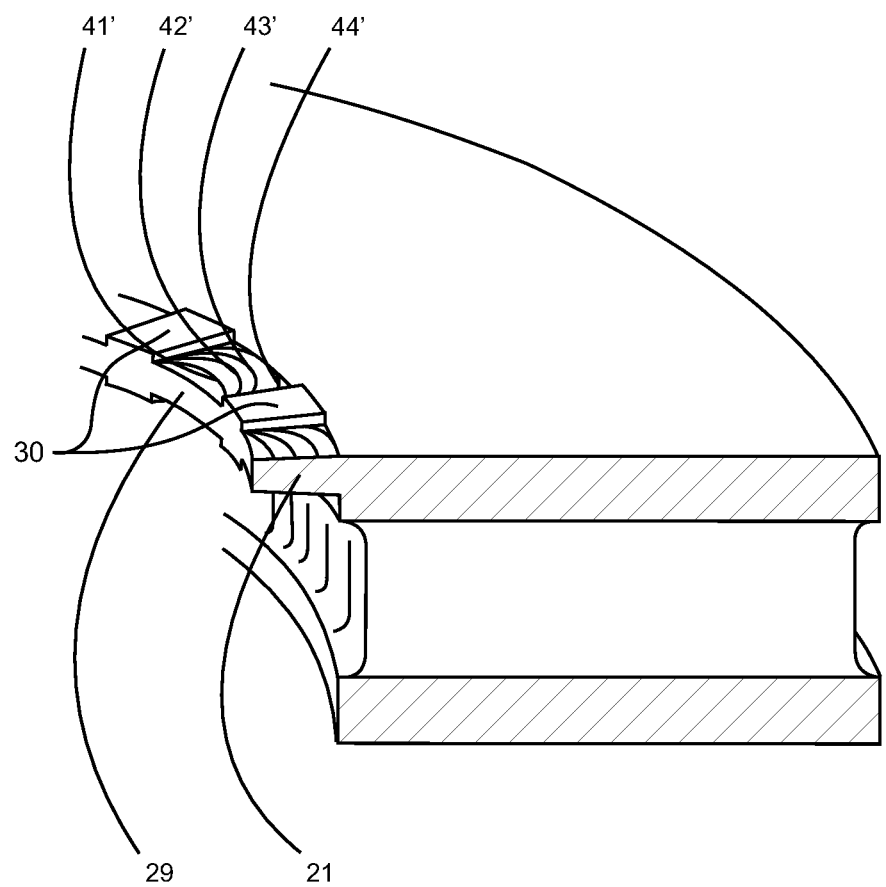
FIG. 7 shows a sectional view of one illustrative variation of the invention.

Referring to FIG. 7, the inner flange 21 may include a thin flange portion 29 wherein the alternative flange edge paths 41', 42', 43', and 44' may define an edge of a portion of the thin flange portion 29 that may not extend as far from the cheek portion as the inner flange 21' or at least one spline tooth 30'.

The cheek portion may generally be constructed similar to a brake disc cheek and may include an upper cheek and a lower cheek. The upper cheek and the lower cheek may each have an inner circumference and an outer circumference. The upper cheek and the lower cheek may each be generally disc-like in shape and structure. Both the upper cheek and the lower cheek may include a first working surface and a second working surface, respectively. The upper cheek and lower cheek may be located adjacent to one another and webbing may be disposed there between. The webbing may be constructed and arranged to join the upper cheek to the lower cheek such that the first working surface of the upper cheek is facing away from the second working surface of the lower cheek. The webbing may be any suitable construct for use in a brake disc such as at least one of ribs, posts, or protrusions.

The inner flange of the cheek portion may extend from the inner circumference of the upper cheek, lower cheek, or both. The thickness of the inner flange may gradually decrease, that is, converge, as the inner flange extends toward the circular center of the cheek portion, similar to that as described in the description of FIG. 2 and FIG. 4. The inner flange may include a at least one spline tooth located circumferentially around the inner flange wherein each individual spline tooth may extend from the upper and lower flange faces such that each spline tooth defines a portion raised from the inner flange. The at least one spline tooth may be constructed and arranged circumferentially around the inner flange in an alternating sequence such that each individual spline tooth is circumferentially distanced from the adjacent spline tooth, a portion of the inner flange lying there between.

In a number of variations, as depicted in FIGS. 4 and 5, the inner flange 21' may include at least one spline tooth 27' located circumferentially around the inner flange 21' wherein each individual spline tooth 27' may extend from the upper 27' and lower flange faces 29' such that each spline tooth 27' defines a portion raised from the inner flange 21'. The at least one spline tooth 27' may be constructed and arranged circumferentially around the inner flange 21' in an alternating sequence such that each individual spline tooth 27' is circumferentially distanced from the adjacent spline tooth 27', without a portion of the inner flange 21' lying there between.

In a number of variations, as depicted in FIG. 7, the inner flange 21 may include at least one spline tooth located circumferentially around the inner flange wherein each individual spline tooth may extend from the upper and lower flange faces such that each spline tooth defines a portion 30 raised from the inner flange 21. The at least one spline tooth may be constructed and arranged circumferentially around the inner flange in an alternating sequence such that each individual spline tooth is circumferentially distanced from the adjacent spline tooth, a portion of the inner flange lying there between wherein the inner flange may not extend as far from the inner circumference of the check portion as the at least one spline tooth do.

The hub portion 12' may be generally constructed similar to the hub of a brake disc. The hub portion 12' may include a receiving flange 31' constructed and arranged to mechanically connect to and affix the cheek portion 10' to the hub portion 12'.

According to variation 1, a product may include a hub portion and a cheek portion. The hub portion may include a receiving flange. The cheek portion may include an upper cheek and a lower cheek connected and separated by a web. The cheek portion may further include an inner flange extending radially inward from the upper cheek constructed and arranged to mechanically engage and communicate with the receiving flange of the hub portion such that the hub portion and the cheek portion may be a single part. The inner flange may include a at least one spline tooth circumferentially arranged around the inner flange and constructed and arranged to facilitate the mechanical engagement of the receiving flange and the inner flange.

Variation 2 may include a product as set forth in variation 1 wherein the upper cheek portion may have a first working surface exposed and the lower cheek portion may have a second working surface exposed, the second working surface facing the opposite direction of the first working surface.

Variation 3 may include a product as set forth in any of variation 1 or 2 wherein the at least one spline tooth may be arranged symmetrically around the circumference of the inner flange and wherein adjacent to each individual spline tooth is a portion of the inner flange.

Variation 4 may include a product as set forth in any of variations 1 through 3 wherein the at least one spline tooth and the inner flange may gradually converge in thickness as the inner flange and the at least one spline tooth extend radially inward from the cheek portion.

Variation 5 may include a product as set forth in any of variations 1 through 4 wherein the thickness of the at least one spline tooth may be thicker than the thickness of the upper cheek portion where the upper cheek portion and the at least one spline tooth meet such that a portion of each individual spline tooth extends a distance above the working surface of the upper cheek portion.

Variation 6 may include a product as set forth in any of variations 1 through 5 wherein a portion of the inner flange located between adjacent spline teeth may radially shorter in length than the adjacent spline teeth.

Variation 7 may include a product as set forth in any of variations 1 through 6 wherein the hub portion may include a receiving flange that may include an upper flange and a lower flange wherein the receiving flange may be constructed and arranged to engage the inner flange of the cheek portion Variation 8 may include a product as set forth in any of variation 7 wherein the receiving flange may define a gap between the receiving flange and the inner flange of the cheek portion at an inner circumference of the inner flange and the at least one spline tooth.

Variation 9 may include a method that may include providing a cheek portion wherein the cheek portion may include an upper cheek, a lower cheek, and webbing. The upper cheek portion may include an inner flange extending radially inward from the upper cheek. The method may further include placing the cheek portion within a mold and casting a hub portion around the cheek portion. The method may further include forming a receiving flange that may include an upper flange and a lower flange as a part of the hub portion. The inner flange may be constructed and arranged to engage the receiving flange of hub portion wherein the upper flange may engage an upper surface of the inner flange and the lower flange may engage a lower surface of the inner flange such that the brake hub and the cheek portion are connected.

Variation 10 may include a method as set forth in any of variation 9 wherein the hub portion may further include a at least one of integral columns disposed between the upper flange and lower flange and wherein the upper flange, lower flange, and integral columns define a at least one of voids.

Variation 11 may include a method as set forth in any of variations 9 through 10 further including forming a gap located at the interface of the inner flange of the cheek portion and the receiving flange of the brake hub.

Variation 12 may include a method as set forth in any of variations 9 through 11 wherein the inner flange of the cheek portion may include a at least one spline tooth arranged symmetrically around the circumference of the inner flange and wherein adjacent to each individual spline tooth is a portion of the inner flange.

Variation 13 may include a method as set forth in any of variations 9 through 12 wherein a portion of the inner flange located between spline teeth may radially shorter in length than the adjacent spline teeth.

Variation 14 may include a method as set forth in any of variations 9 through 13 wherein the thickness of the at least one spline tooth may be thicker than the thickness of the upper cheek portion where the upper cheek portion and the at least one spline tooth meet such that a portion of each individual spline tooth extends a distance above the upper cheek portion.

Variation 15 may include a method as set forth in any of variations 9 through 14 further including post-processing the inner flange such that the at least one spline tooth extends radially inward farther than the inner flange Variation 16 may include a method as set forth in any of variations 9 through 15 further including, prior to casting a hub portion, coating the at least one spline tooth with a ceramic or non-wetting coating or similar material to prevent intermetallic bonding between the cheek portion and a second molten material subsequently added to the cavity.

Variation 17 may include a product that may include a cheek portion. The cheek portion may include an upper cheek, a lower cheek, and webbing. The webbing may be disposed between the upper cheek and the lower cheek. The upper cheek may provide an upper working surface, and the lower cheek may provide a lower working surface. The cheek portion may also include an inner flange extending radially inward from an inner circumference of the upper cheek and ending at an inner circumferential face. The inner flange may include at least one spline tooth arranged circumferentially around the inner flange, extending from the inner circumferential face to the inner circumference of the upper cheek. The at least one spline tooth may be thicker than the thickness of the inner flange and may be constructed arranged to be a raised ridge on the inner flange. The thickness of both the inner flange and the at least one spline tooth may gradually converge as the inner flange and the at least one spline tooth extend inward from the inner circumference of the upper cheek. The product may also include a hub portion connected to the inner flange and at least one spline tooth. The hub portion may include a receiving flange that may include an upper flange and a lower flange. The receiving flange may be constructed and arranged to both overly and underlie the inner flange and at least one spline tooth such that a gap exists between the inner flange and the receiving flange at the interface of the hub portion and the cheek portion.

Variation 18 may include a product as set forth in variation 17 wherein the at least one spline tooth extends radially inward farther than the inner flange.

Variation 19 may include a product as set forth in any of variations 17 through 18 wherein the at least one spline tooth may include a ceramic coating or similar material to prevent intermetallic bonding between the cheek portion and the hub portion.

The above description of variations of the invention is merely demonstrative in nature and, thus, variations thereof are not to be regarded as a departure from the spirit and scope of the inventions disclosed within this document.

What is claimed is:

1. A product comprising:
a hub portion and a cheek portion;
the hub portion comprising a receiving flange;
the cheek portion comprising an upper cheek and a lower cheek connected and separated by a web;
the cheek portion comprising an inner flange extending radially inward from the upper cheek and being constructed and arranged to mechanically engage and communicate with the receiving flange of the hub portion such that the hub portion and the cheek portion are be a single part; and
the inner flange comprising at least one spline tooth constructed and arranged to facilitate the mechanical engagement of the receiving flange and the inner flange and wherein the at least one spline tooth and the inner flange gradually converge in thickness as the inner flange and the at least one spline tooth extend radially inward from the cheek portion and wherein a portion of the inner flange located between adjacent spline teeth are radially shorter in length than the adjacent spline teeth.

2. A product as set forth in claim 1:
wherein the upper cheek portion comprises a first working surface and the lower cheek portion comprises a second working surface, the second working surface facing the opposite direction of the first working surface.

3. A product as set forth in claim 1:
wherein one or more spline teeth are arranged symmetrically around the circumference of the inner flange and wherein a portion of the inner flange is adjacent to each individual spline tooth.

4. A product as set forth in claim 1:
wherein the thickest portion of the at least one spline tooth is thicker than the thickness of the upper cheek portion such that a portion of each individual spline tooth extends a distance above the working surface of the upper cheek portion.

5. A product as set forth in claim 1:
wherein the hub portion comprises a receiving flange which comprises an upper flange and a lower flange and wherein the receiving flange is constructed and arranged to engage the inner flange of the cheek portion.

6. A product as set forth in claim 1:
wherein the receiving flange defines a gap between the receiving flange and the inner flange of the cheek portion at an inner circumference of the inner flange and the at least one spline tooth.

7. A method comprising:
providing a cheek portion;
the cheek portion comprising an upper cheek, a lower cheek, and a webbing;
the upper cheek comprising an inner flange extending radially inward from the upper cheek;
placing the cheek portion within a mold;
casting a hub portion around the cheek portion;
forming an upper flange and a lower flange as a part of the hub portion;
forming a gap located at the interface of the inner flange of the cheek portion and the receiving flange of the brake hub;
the inner flange being constructed and arranged to engage the receiving flange of hub portion wherein the upper flange engages an upper surface of the inner flange and the lower flange engages a lower surface of the inner flange such that the brake hub and the cheek portion are connected.

8. A method as set forth in claim 7:
wherein the hub portion comprises a at least one of integral columns disposed between the upper flange and lower flange and wherein the upper flange, lower flange, and integral columns define at least one void.

9. A method as set forth in claim 7:
wherein the inner flange of the cheek portion comprises at least one spline tooth arranged symmetrically around the circumference of the inner flange and wherein adjacent to each individual spline tooth is a portion of the inner flange.

10. A method as set forth in claim 7:
wherein a portion of the inner flange located between individual spline teeth is radially shorter in length than the adjacent spline teeth.

11. A method as set forth in claim 7:
wherein the thickest portion of the at least one spline tooth is thicker than the thickness of the upper cheek portion such that a portion of each individual spline tooth extends a distance above the upper cheek portion.

12. A method as set forth in claim 7 further including:
post-processing the inner flange such that the at least one spline tooth extends radially inward farther than the inner flange.

13. A method as set forth in claim 7 further including:
prior to casting a hub portion, coating the at least one spline tooth with a ceramic or non-wetting coating or similar material to prevent intermetallic bonding between the cheek portion and a second molten material subsequently added to the cavity.

14. A product comprising:
a cheek portion comprising an upper cheek, a lower cheek, and webbing;
the webbing being disposed between the upper cheek and the lower cheek;
the upper cheek comprising an upper working surface, and the lower cheek comprising a lower working surface;
the cheek portion also comprising an inner flange extending radially inward from an inner circumference of the upper cheek and ending at an inner flange inner circumference;
the inner flange comprising one or more spline teeth arranged circumferentially around the inner flange, extending from the inner flange inner circumference to the inner circumference of the upper cheek and wherein the one or more spline teeth extend radially inward farther than the inner flange;
the one or more spline teeth being thicker than the thickness of the inner flange and being constructed and arranged to be a raised ridge on the inner flange;
the thickness of both the inner flange and the one or more spline teeth gradually converging as the inner flange and the one or more spline teeth extend inward from the inner circumference of the upper cheek;

a hub portion connected to the inner flange and one or more spline teeth;

the hub portion comprising a receiving flange comprising an upper flange and a lower flange;

the receiving flange being constructed and arranged to both overly and underlie the inner flange and one or more spline teeth such that a gap exists between the inner flange and the receiving flange at the interface of the hub portion and the cheek portion.

15. A product as set forth in claim 14:

wherein the one or more spline teeth comprise a ceramic coating or similar material to prevent intermetallic bonding between the cheek portion and the hub portion.

* * * * *